UNITED STATES PATENT OFFICE.

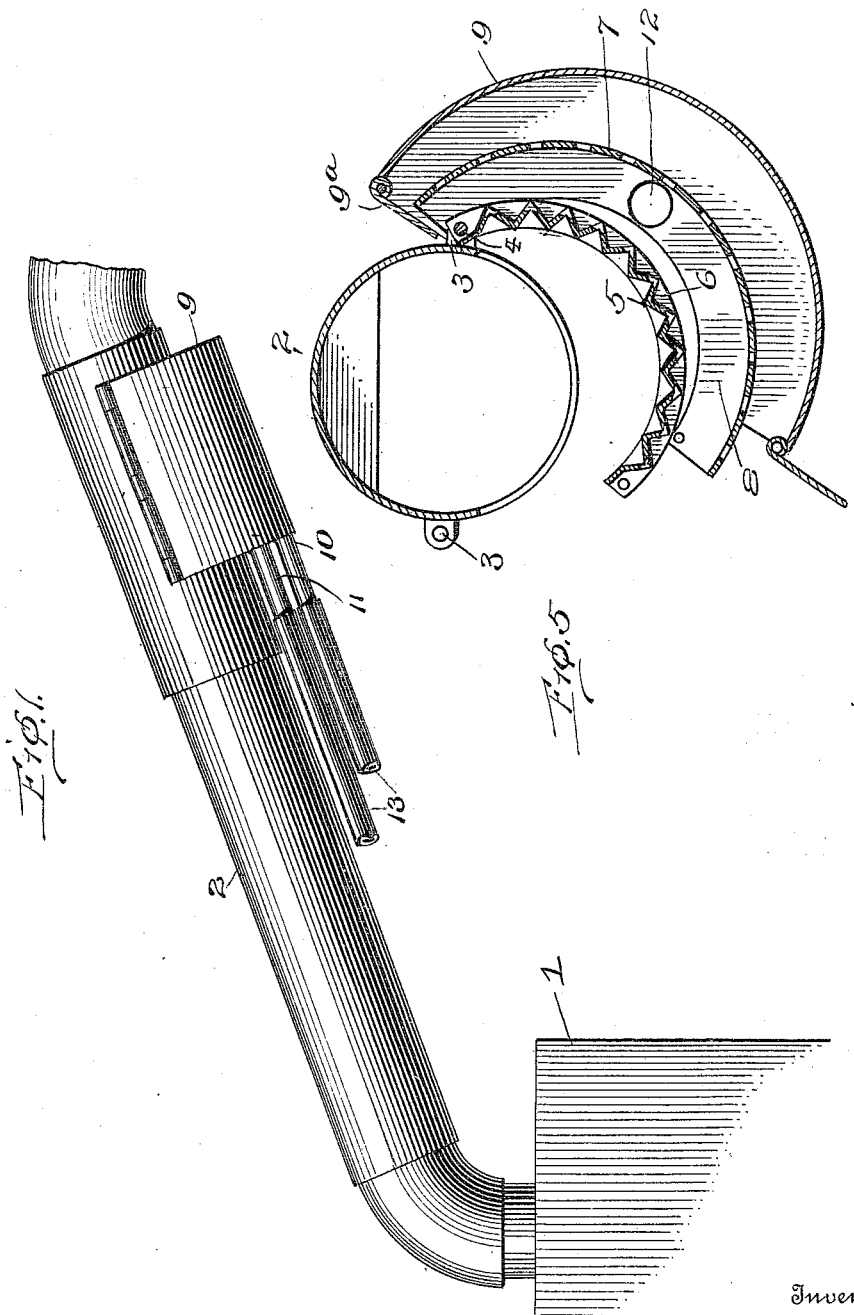

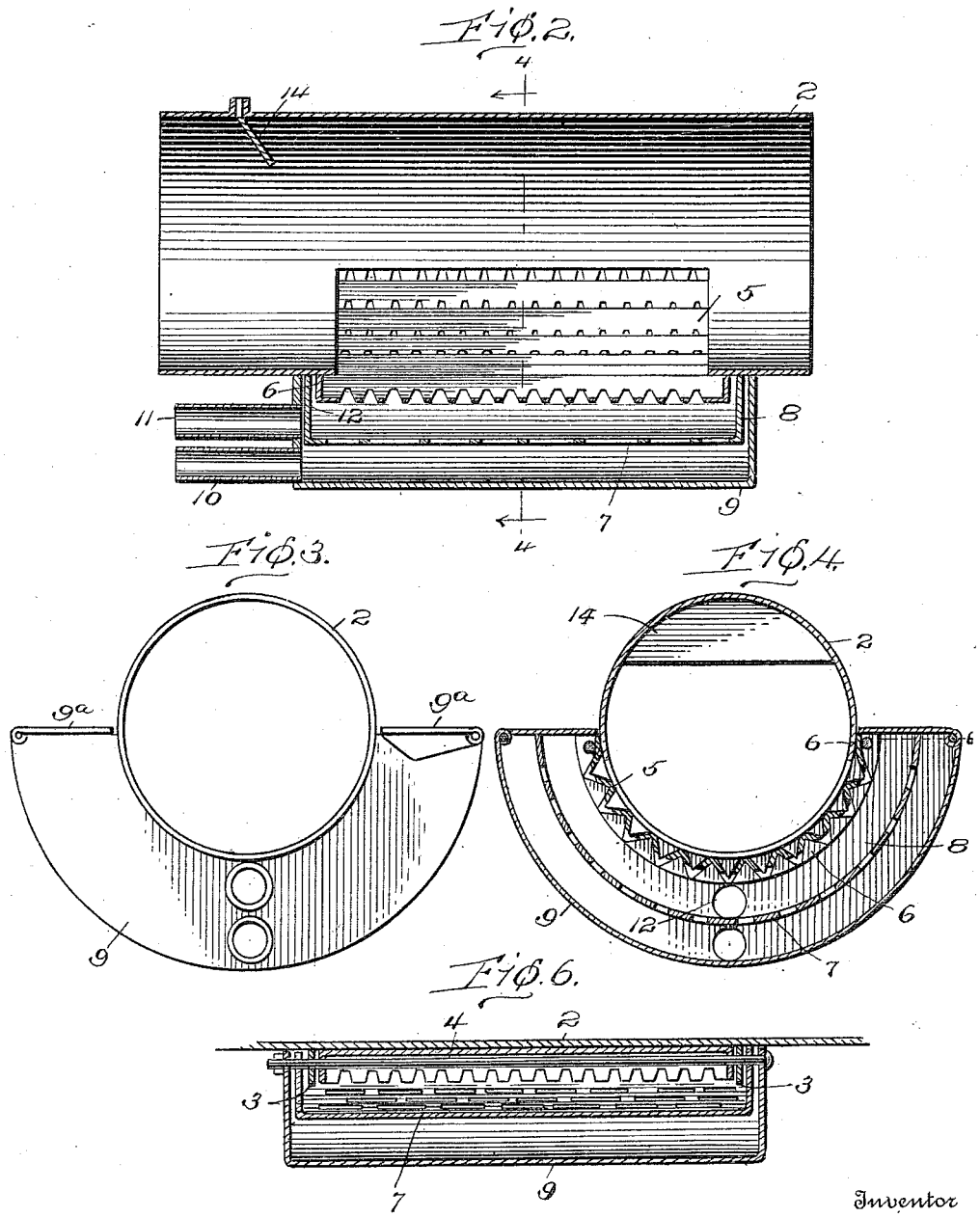

DANIEL BERGSMAN, OF ADAMS, NORTH DAKOTA.

ATTACHMENT FOR PNEUMATIC STACKERS.

979,412.        Specification of Letters Patent.        Patented Dec. 27, 1910.

Application filed July 2, 1910. Serial No. 570,035.

*To all whom it may concern:*

Be it known that I, DANIEL BERGSMAN, citizen of the United States, residing at Adams, in the county of Walsh and State of North Dakota, have invented certain new and useful Improvements in Attachments for Pneumatic Stackers, of which the following is a specification.

The present invention relates in general to pneumatic straw stackers, and more particularly to a novel attachment to the same for saving the grain and seed which would otherwise be stacked with the straw and be a complete waste.

The object of the invention is the provision of a grain and seed saving attachment for pneumatic stackers which is comparatively simple and inexpensive in its construction, which can be readily applied to a straw stacker of any conventional construction, and which will operate in an effective manner to collect and save the grain and seed which may pass into the stacker along with the straw and chaff.

With these and other objects in view, the invention consists in certain combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a pneumatic stacker tube having the grain and seed saving attachment applied thereto. Fig. 2 is a longitudinal sectional view through the stacker tube and the attachment. Fig. 3 is an end view of the attachment showing the same as applied to a stacker tube. Fig. 4 is a transverse sectional view on the line 4—4 of Fig. 2. Fig. 5 is a similar view showing the screen sections and casing as swung outwardly away from the stacker tube, and Fig. 6 is an enlarged sectional view on the line 6—6 of Fig. 4.

Corresponding and like parts are referred to in the following description and indicated in all the views of the drawings by the same reference characters.

Referring to the drawings, the numeral 1 designates a threshing machine which may be of any conventional construction and is equipped with a pneumatic stacker embodying a tube 2 through which the straw and chaff is blown in the usual manner. This stacker tube 2 has an opening formed therein at a suitable point, and in the present instance this opening is shown as extending substantially half-way around the tube on the lower side thereof. Ears 3 project from the exterior of the stacker tube adjacent the corners of the said opening, and those ears upon opposite sides of the tube are formed with corresponding perforations designed to receive rods 4. A wheat saving sieve 5 is fitted removably over the opening and has a comparatively large mesh so that the wheat and seeds passing through the stacker tube will drop through the openings of the sieve, while the straw and chaff will be blown through the tube and stacked in the usual manner. This wheat sieve may be of any suitable construction, and is illustrated upon the drawings as being in the form of a corrugated sheet of metal having openings at the base of the various corrugations. Each end of the wheat sieve 5 is provided with a flange 6 and the ends of the said flanges are formed with suitable openings adapted to receive the rods 4 for the purpose of holding the wheat sieve in position. A second sieve 7 which has a finer mesh than the wheat sieve 5 is also provided for separating the wheat from the seed, the seed passing through the second sieve 7 while the wheat is collected thereby. This seed sieve 7 is spaced from the wheat sieve 5 and is provided at its ends with the flanges 8 which are wider than the flanges 6 of the wheat sieve and are provided with suitable openings for receiving the rods 4, the said rods also serving to hold the second sieve in position. A casing 9 incloses the two sieves or screens and is spaced from the outer sieve 7 so as to provide a space for collecting the seed. The ends of the casing 9 are formed with suitable openings for receiving the rods 4, whereby the casing is held in position upon the stacker tube, while the top portions 9ª of the casing are hinged so as to swing outwardly to admit of ready access being had to the interior of the casing, either for securing the device in position, or for any other purpose. The seed which may be collected within the casing 9 after passing through both the wheat sieve 5 and the seed sieve 7 is designed to be discharged through a spout 10 at one end of the casing, while the wheat or grain which may pass through the wheat sieve 5 and collect upon the seed sieve 7 is designed to be discharged through a second spout 11 at one end of the casing 9, an opening 12 being formed in one of the flanges 8 of the sieve 7 opposite the spout 11. From these two spouts 10 and 11 the grain and seed may be carried in any suitable manner as by means of the pipes 13 to suitable receptacles.

It will thus be obvious that when the above attachment has been applied to the stacker tube, the grain and seed which are heavier than the straw and chaff will naturally gravitate to the lower side of the stacker tube, and will pass through the wheat sieve 5 and be separated within the casing 9 by means of the seed sieve 7, the grain and seed being discharged separately through the two spouts 10 and 11, while the straw and chaff is blown through the stacker tube in the usual manner. Attention is further directed to the fact that the wheat sieve 5, seed sieve 7, and casing 9 are constructed entirely independent of each other so that they can be readily separated and cleaned, and also with a view of substituting sieves or screens of a different mesh for the various kinds of grain. The entire attachment is held removably in position by means of the rods 4, and should it be desired to use the stacker without the attachment, it would merely be necessary to withdraw the two rods 4, remove the attachment, and apply any suitable form of cover to the opening in the stacker tube.

Under some conditions, it may be found desirable to place a deflector plate 14 in the top of the stacker tube 2 for throwing the material passing through the stacker tube down against the lower side thereof, although this is entirely optional with the user.

It will thus be obvious that I have provided a grain and seed saving attachment which can be readily applied to a pneumatic stacker and will operate in an effective manner to collect the grain and seed which would otherwise be stacked with the straw and chaff and be a complete waste.

Having thus described the invention, what I claim as new and desire to secure by Letters Patent, is:—

1. The combination of a conveyer having an opening therein, a series of separable screen members fitted over the opening, the said screen members being received one within the other and being formed with telescoping flanges, and means for engaging the telescoping flanges to hold the screen sections in position.

2. The combination of a conveyer having an opening therein, a series of separable screen members received one within the other and fitted over the opening, the said screen members being formed with telescoping flanges, ears projecting from the conveyer, and bolts connecting the ears and also engaging the telescoping flanges to hold the screen sections removably in position.

3. The combination of a conveyer having an opening therein, a series of separable screen members received one within the other and fitted over the opening, the said screen members being formed with telescoping flanges, and a separable casing applied to the conveyer and receiving the screen members within the same.

4. The combination of a conveyer having an opening therein, a series of separable screen members received one within the other and fitted over the opening, the said screen members being formed with telescoping flanges, a casing receiving the screen members and formed with ends which telescope over the flanges of the screen sections, and bolts carried by the conveyer for engaging the telescoping flanges of the screen sections and the casing.

5. The combination of a conveyer having an opening therein, a series of separable screen members formed at opposite ends thereof with flanges which have a telescoping connection with each other and are of different widths to admit of the screens being spaced from each other, a casing receiving the screen sections within the same and formed with ends which telescope over the flanges of the screen sections, ears projecting from the conveyer, and bolts connecting the ears and passing through the flanges of the screen members and also through the ends of the casing.

In testimony whereof I affix my signature in presence of two witnesses.

DANIEL BERGSMAN.

Witnesses:
L. J. OLSON,
G. M. BARSNESS.